CLOSED LOOP ELECTRIC CIRCUIT

Filed July 14, 1966

INVENTOR
Joseph H. Kiser
BY [illegible]
ATTORNEYS.

United States Patent Office 3,445,755

Patented May 20, 1969

3,445,755

CLOSED LOOP ELECTRIC CIRCUIT

Joseph H. Kiser, Stamford, Conn., assignor to Vari-L Company, Inc., Stamford, Conn., a corporation of Connecticut Filed July 14, 1966, Ser. No. 565,264

Int. Cl. G01r *17/10*

U.S. Cl. 323—75 6 Claims

ABSTRACT OF THE DISCLOSURE

This circuit has a reference element on one side of a bridge, and the reference element has a compensating part through which a current can be passed to change the amount of impedance that the reference element provides. An adjustable impedance on the other side of the bridge is used to unbalance the bridge. This provides a voltage across the bridge of an amplitude dependent upon the degree of unbalance. This voltage supplies a current, through an amplifier, to the compensating part of the reference impedance and rebalances the bridge. Slave impedances of identical characteristics with the reference impedance have their compensating parts in series with the compensating part of the reference impedance of the bridge, and those changes in the adjustable impedance produce identical changes in the slave impedances.

*Summary of the invention*

The invention relates to electrical control systems.

It is an object of the invention to provide a system for controlling one, or a "chain" or "gang" of electrically variable impedances by means of a bridge circuit employing a reference element which is itself identical to the one or more units to be controlled. It is often desirable to use a multiplicity of such variable impedances in cascaded stages, as for example, the use of several electrically variable inductors in the tuned radio frequency amplifier of a receiver, but variations arising in the impedances themselves make it impossible to calibrate a dial that will indicate their frequency setting with reasonable accuracy; being basically variable devices, they are subject to errors such as hysteresis, creepage, and drift with temperature changes.

With modern production methods, it is feasible to make groups of units which have electrical characteristics very close to one another, and it follows that their errors are similar also. Therefore, a system which will sense and correct the errors of one of the units in the chain will also correct all the others, as long as they receive identical commands.

The devices for which this invention is useful are any of those wherein their impedance to the flow of current through them (being AC or DC, depending upon the type of device employed) is controlled by a separate and distinct control voltage or current.

Other objects, features and advantages of the invention will appear or be pointed out as the description proceeds.

*Brief description of the drawings*

In the drawing, forming a part hereof, in which like reference characters indicate corresponding parts in all the views.

*Description of the preferred embodiments*

Figure 1:
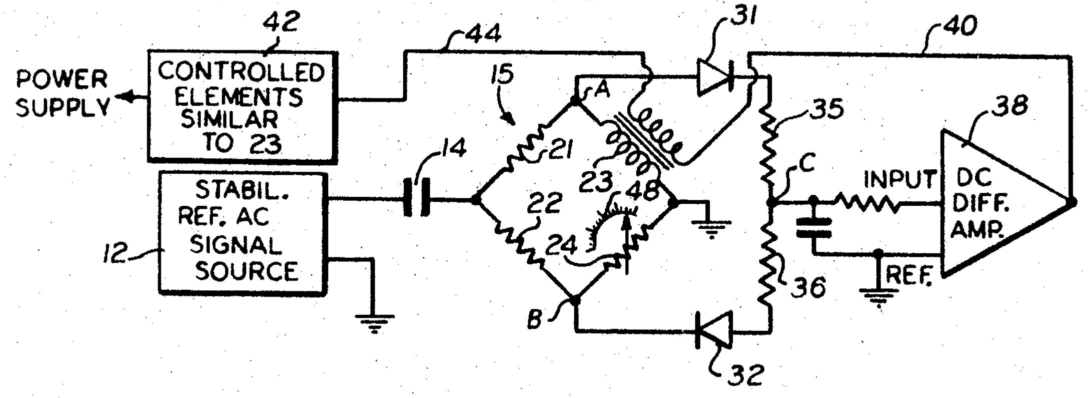
FIGURE 1 is a wiring diagram of the preferred embodiment of the invention.

A stabilized reference alternating current signal source 12 supplies a reference voltage through a capacitor 14 to a bridge circuit 15. This bridge circuit is made up of reference impedances 21 and 22, an electrically variable impedance 23 and an adjustable reference impedance 24, each of these impedances being in a different leg of the bridge. The voltage from the capacitor 14 causes currents through the impedances such that:

$$V_S=(Z_{21}+Z_{23})I_1$$
$$V_S=(Z_{22}+Z_{24})I_2$$

where $I_1$ is the current flowing in the two upper legs of the bridge 15 and $I_2$ is the current flowing in the two lower legs of the bridge 15.

The impedances 21 and 23 are in different legs on one side of the bridge circuit, and the impedances 22 and 24 are in different legs on the other side of the bridge circuit.

In most cases, $Z_{21}$ is made equal to $Z_{22}$. The AC voltage at points A and B of the bridge 15 with respect to ground is then:

$$V_A=I_1U_{23}$$
$$V_B=I_2Z_{24}$$

These voltages are rectified by similar diodes 31 and 32, which are arranged to produce DC voltages of opposing polarity. These voltages are summed at a center point C between load impedances 35 and 36. If $V_A=V_B$, the net resulting voltage at point C is zero and the bridge is balanced. If $V_A$ is not equal to $V_B$, a voltage at C will result, the magnitude and polarity of which is determined by the voltage of greatest absolute value. The presence of this voltage indicates that the bridge is unbalanced and hence that $Z_{23}$ is not equal to $Z_{24}$.

The direct current error voltage is filtered and applied to the input of a differential amplifier 38. The reference input to the amplifier is connected to ground or zero voltage DC.

When an unbalanced or error volage exists at the amplifier input, the amplifier 38 amplifies this error voltage and supplies a proportional DC output voltage through a conductor 40 to the impedance 23 which tends to rebalance the bridge so that $V_A$ AC=$V_B$ AC, and, therefore, $Z_{23}=Z_{24}$.

The electrically variable elements which are to be controlled are indicated by the reference character 42 and these elements are connected in series, by a conductor 44, with the conductor 40, and the portion of the impedance 23 to which the conductor 40 supplies power from the amplifier 38.

The electrically variable elements 42 are identical in control characteristics with the impedance 23 and receive the same correcting signal as the impedance 23 by virtue of their series connection with the circuit of the impedance 23 through which the control signal is transmitted. Further, any drift in parameters due to temperature, hysteresis or any time-associated variable, such as disaccommodation or relaxation, is automatically accommodated for in the closed loop.

Errors resulting from any cause except drift in the reference impedance 24 are compensated for by this system. The elements 21, 22, 31, 32, 35 and 36 are assumed to drift equally, producing equal and opposite effect, and hence do not interfere with the comparison principle of the system. The impedance 24 is chosen as a stable adjustable element, generally a mechanically adjustable resistor.

The external impedances 42, similar to the impedance 23, can be utilized in any control application and are completely divorced from the system. There is no limit to the number of external devices slaved to the performance of the reference impedance 23. The accuracy of the system is, of course, dependent on the temperature differential between the reference impedance 23 and the other control elements being held to a minimum. When high accuracy is desired, for instance, if the control impedances 42 are remote from the closed loop of the bridge 15, then a controlled environment for the electrically variable loop element, as well as the slaved elements, may be desirable.

The stable adjustable reference impedance element 24 can have a dial, as indicated by the scale 48 calibrated to its characteristic, and the impedance element 23 along with the slaved elements 42, precisely and reproduceably adjust to the setting of the dial 48. Hence the impedance element 24 can be tailored to produce any degree of linear or non-linear system change corresponding to dial rotation. It is also a feature of the invention that the adjustment of the operating point for the impedance element 23 can be accomplished with a programmed voltage.

Figure 2:
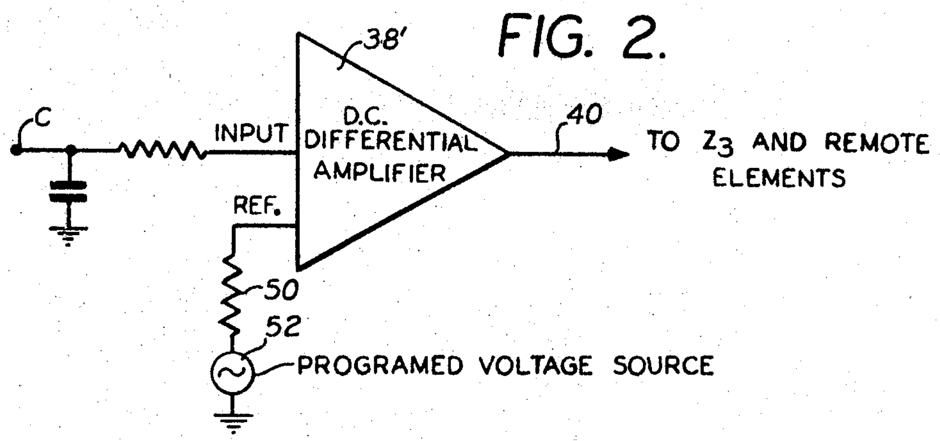
FIGURE 2 is a fragmentary wiring diagram of a part of the circuit shown in FIGURE 1 but showing a modification of the invention.

FIGURE 2 shows a modification in which the error voltage from the point C is supplied to an amplifier 38', corresponding to the amplifier 38 of FIGURE 1 and with the same resistance and capacitor connections as in FIGURE 1. Instead of connecting the reference side of the amplifier 38' directly to ground, as with the amplifier 38 of FIGURE 1, the amplifier 38' is connected through a resistor 50 with a programmed voltage source 52; and the variation in the output of the amplifier 38' to the conductor 40 depends not only upon variations in the error voltage at C, but also upon variations in the programmed voltage from the source 52.

The voltage from the source 52 applied to the reference input of the differential amplifier 38' causes the input relative to the reference to be $V_C$=zero, it forming other than $V_C$=zero with respect to ground. Therefore, the bridge will rebalance itself to accommodate changes in this reference voltage. It can be a programmable DC or AC voltage (within loop band width). In any event, the circuit adjusts itself precisely to the changing reference, with corresponding changes automatically occurring in the external variable elements 42. Both a frequency modulation and amplitude modulation change is accommodated by the loop within the limitations of loop band width or response time.

Figure 3:
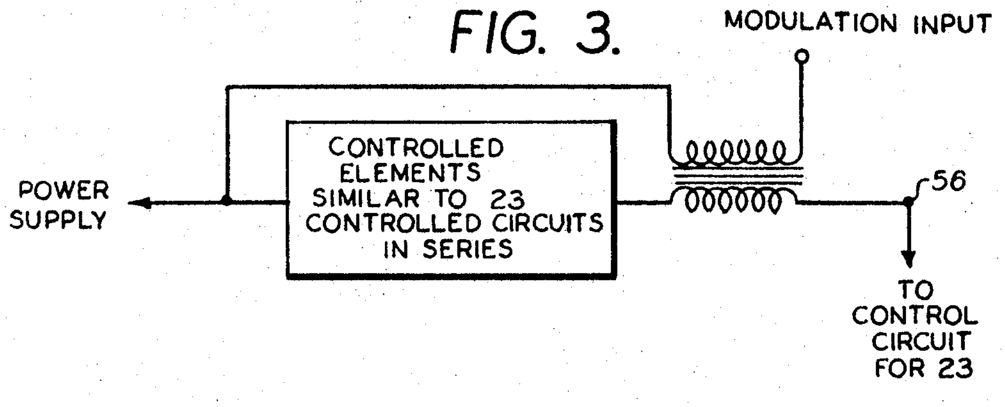
FIGURE 3 is a fragmentary view showing another modification of the invention.

FIGURE 3 shows another modification and includes an important feature of the system which can be realized by supplying external modulation to the electrically variable elements at a point 56 of the circuit. The band width of the DC differential amplifier can be reduced by appropriate feedback elements so that the modulating signal falls outside of it. When this condition is established, the control loop does not respond to the imposed modulation, but tends to maintain midpoint stability at the center of the modulated range of the electrically variable element, corresponding to the setting of the variable impedance element 24, as previously described. Hence, for many applications where electrically variable elements must be swept through a range, and the mid-range stability is important, this system meets the requirement.

The preferred embodiment and some modifications of the invention have been illustrated and described, but changes and other modifications can be made and some features can be used in different combinations without departing from the invention as defined in the claims.

What is claimed is:

1. A closed loop electric circuit for controlling an electrical system for remote control of a slave electrically variable impedance unit element including, in combination:

(a) a bridge circuit, (b) a reference elements in one leg on one side of the bridge circuit, and (c) a slave element having substantially identical the same impedance characteristics to those of the reference element, (d) an adjustable impedance in the corresponding leg on the other side of the bridge circuit, (e) means for supplying stable electric power to the bridge circuit, (f) terminals at the connections of the legs at both sides of the bridge across which an error signal exists when the bridge is unbalanced, a control circuit from said terminals for supplying the error signal back to the reference element, the reference element having a compensating part responsive to the amplitude of the error signal for rebalancing the bridge, (g) said control circuit being connected in series through said compensating part of the reference element to said slave element that is to be controlled.

2. The combination described in claim 1 characterized by said circuit being connected with a gang of electrically variable impedance slave elements and said system having a control circuit connection with each of the impedance units similar to that connected with the reference element in the bridge circuit, all of the control circuit connections for each of the electrically variable impedance elements being in series with that of the compensating part of the reference element in the bridge circuit whereby the electrical characteristics of all of the electrically variable impedance elements change together and in the same way.

3. The combination described in claim 1 characterized by said control circuit including a differential amplifier having its input connected with said terminals and its output connected back to the compensating part of the reference element in the bridge circuit.

4. The combination described in claim 3 characterized by the stable electric power supply being an alternating current supply, rectifiers in the control circuit from said terminals of the bridge connected with a summing point and with the rectifiers on the different sides of the summing point facing in opposite directions, the control circuit having said summing point connected wth the input of the amplifier, and an additional source of power for the amplifier.

5. The combination described in claim 4 characterized by the additional source of power for the amplifier being a programmed voltage source.

6. The combination described in claim 3 characterized by the amplifier being a direct current differential amplifier, a circuit for applying an external modulation signal to the electrically variable element that is to be controlled, the modulation signal of the wave length being one that falls outside of the band width of the amplifier so that the control circuit does not respond to the imposed modulation.

References Cited

UNITED STATES PATENTS

| | | |
|---|---|---|
| 3,085,194 | 4/1963 | Revesz. |
| 3,152,301 | 10/1964 | Burk. |
| 3,315,153 | 4/1967 | Whatley. |

JOHN F. COUCH, *Primary Examiner.*

G. GOLDBERG, *Assistant Examiner.*

UNITED STATES PATENT OFFICE
CERTIFICATE OF CORRECTION

Patent No. 3,445,755 May 10, 1969

Joseph H. Kiser

It is certified that error appears in the above identified patent and that said Letters Patent are hereby corrected as shown below:

Column 3, line 67, beginning with "1. A closed" cancel all to and including "element," in line 8, column 4, and insert the following:

1. An electrical system for remote control of a slave electrically variable impedance element including, in combination, (a) a bridge circuit, (b) a reference element in one leg on one side of the bridge circuit, (c) a slave element having the same impedance characteristics to those of the reference element, Signed and sealed this 21st day of April 1970.

(SEAL)

Attest:

Edward M. Fletcher, Jr.
Attesting Officer

WILLIAM E. SCHUYLER, JR.
Commissioner of Patents